(No Model.) 2 Sheets—Sheet 1.

F. SEAVER.
STEAM MOTOR.

No. 603,660. Patented May 10, 1898.

Witnesses.
O. N. Keeney
Anna V. Faust.

Inventor
Fred Seaver.
By Benedict & Morsell
Attorneys

THE NORRIS PETERS CO., PHOTO-LITHO., WASHINGTON, D. C.

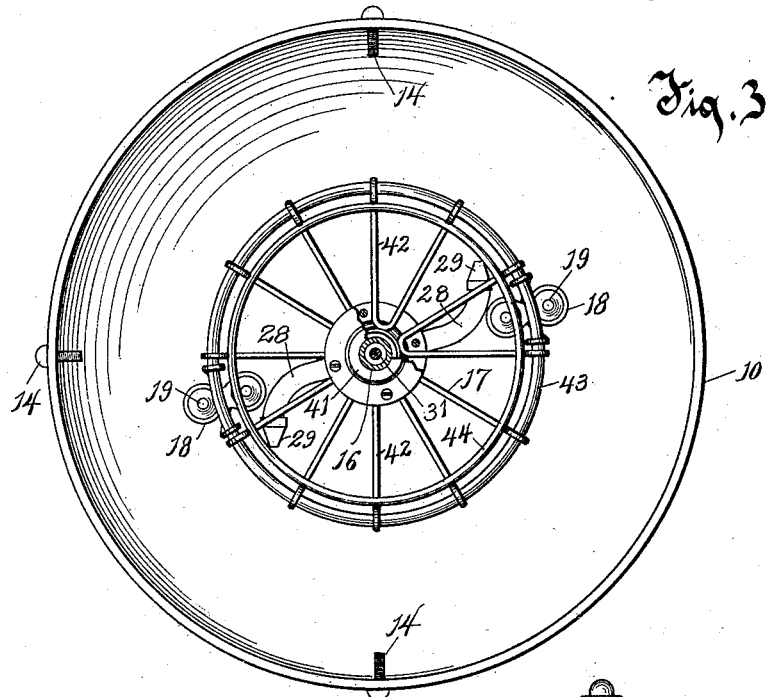
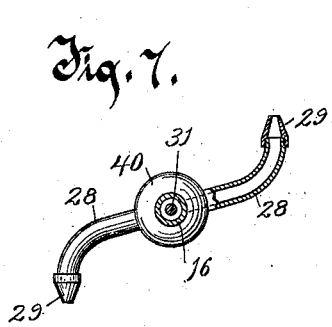
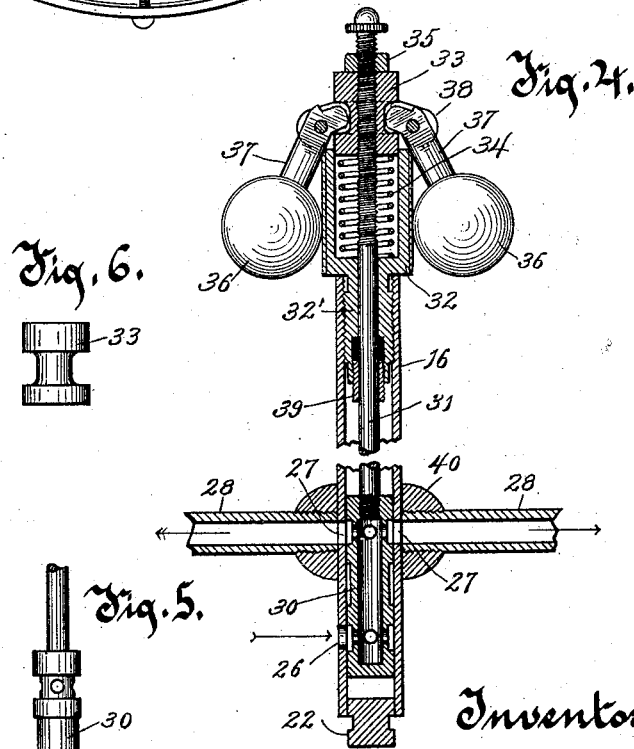

UNITED STATES PATENT OFFICE.

FRED SEAVER, OF LAKE MILLS, WISCONSIN, ASSIGNOR TO THE F. B. FARGO & COMPANY, OF SAME PLACE.

STEAM-MOTOR.

SPECIFICATION forming part of Letters Patent No. 603,660, dated May 10, 1898.

Application filed March 8, 1897. Serial No. 626,497. (No model.)

*To all whom it may concern:*

Be it known that I, FRED SEAVER, of Lake Mills, in the county of Jefferson and State of Wisconsin, have invented a new and useful Improvement in Steam-Motors, of which the following is a description, reference being had to the accompanying drawings, which are a part of this specification.

The object of the invention is to provide an improved motor, being preferably so constructed as to be capable of use with and as a part of a milk-tester, the improved motor being adapted to be operated by the steam that is provided for separating the cream from the milk in the tester.

The invention consists of the mechanism, its parts, and combinations of parts, as hereinafter described and claimed, or their equivalents.

Figure 1:
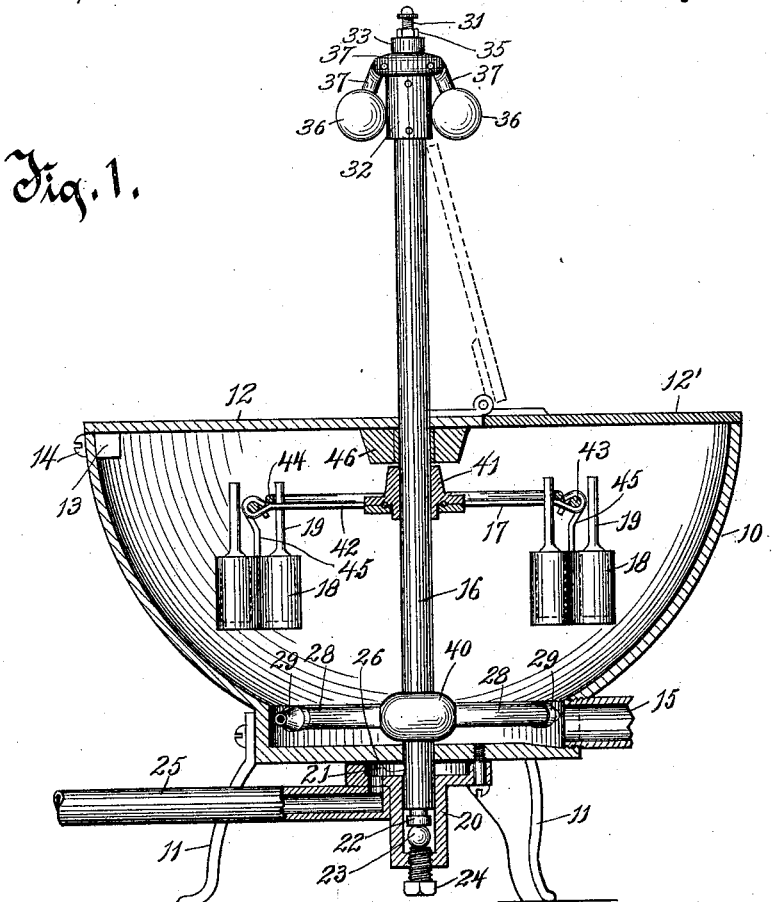
Figure 2:
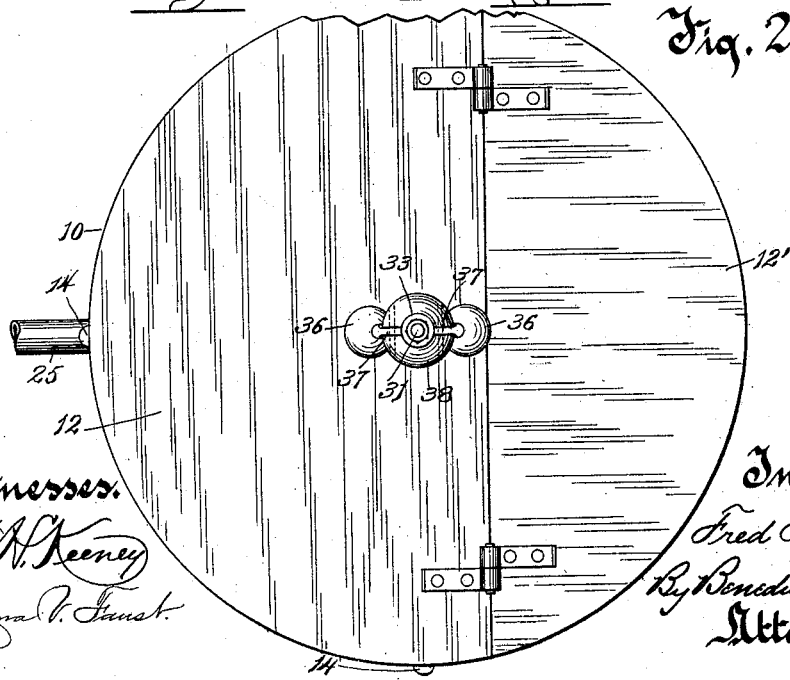

In the drawings, Figure 1 is a vertical section of my improved motor with a milk-tester. Fig. 2 is a top plan view of the same, a small portion being broken away for convenience of illustration. Fig. 3 is a plan of the case of the tester and the mechanism therein, the cover of the case being removed and parts being broken away to exhibit interior construction. Fig. 4 is a longitudinal section of the tubular shaft and of mechanism connected therewith, a central portion being broken away and omitted for convenience of illustration. Figs. 5, 6, and 7 are details.

In the drawings, 10 is a tester-case, preferably made of metal and bowl-shaped, which case is conveniently supported by legs 11 11, secured to the case. A cover 12, resting on the top of the case and covering the major part of the case, is provided at one side with a thereto-hinged lid 12', forming a part of the cover. The principal part of the cover 12 is secured permanently to the case, conveniently by means of lugs 13, riveted to or integral with the cover, which lugs fit against the inner surface of the case near the top and are secured thereto by screws 14. The case and cover are preferably made of metal. The case is also provided with an exhaust-port 15 for the escape of steam and the condensation therefrom.

This milk-tester, like others of the same general character, is provided with means for carrying a number of bottles of milk, which being rotated rapidly causes the separation of the constituent parts of the milk by means of centrifugal action, in connection with acid mingled therewith and the application of sufficient heat in the form of steam.

For supporting and rotating receptacles or pockets, in which bottles of milk are placed, I provide a revolving frame or carriage, in which a vertically-disposed hollow shaft 16, supported on and in the case, is provided with a wheel-frame 17, on which the receptacles or pockets 18 are suspended and in which pockets the milk-containing bottles 19 are placed. The central lowest part of the case 10 is preferably flat, and a steam-chamber shaft-bearing member 20, secured centrally to the under surface of the case, is so constructed as to form a steam-chamber 21 in its upper part and between it and the adjacent bottom of the case 10, and a central vertically-extending shaft-bearing for the lower extremity of the shaft 16, which shaft is preferably provided with a terminal steel plug end 22, that is footed, preferably, on a bearing-ball 23, resting movably on the upper end of an adjusting-screw 24, turning through the lower end of the member 20. A steam-induction pipe 25 leads to a port in the member 20, that opens into the steam-chamber 21.

The hollow shaft 16 is provided with an induction-port 26 opposite the chamber 21, and with eduction-ports 27, leading into hollow radially-extending arms 28 28, located within the case 10. The extremities of the arms 28 28 are turned laterally or tangentially reversely and are preferably provided with terminating nozzles 29 29, having smaller discharging-apertures than the aperture or bore of the arms 28, being thus adapted to reduce the terminal size of the bore of these arms, thus providing for discharging steam therefrom forcibly in contracted jets. The nozzles 29 are secured to the arms 28 by screw-thread, so as to be removable therefrom for conveniently cleaning or blowing out the steam-passages. It must be understood that steam admitted through the pipe 25 and discharging through the nozzles 29 will cause the shaft 16 and its load to revolve rapidly.

For shutting off and regulating the supply of steam admitted to the shaft 16 and discharged through the arms 28 I provide a sleeve or chambered cylindrical valve 30, provided with ports normally registering with the induction-port 26 and the eduction-ports 27. This valve 30 is fitted steam-tight, but movable endwise, in the shaft 16, and is provided with a stem 31, extending up in the shaft 16 and out in a steam-tight, but movable, joint through a head 32, which is provided with a lower plug-like extremity 32', fitted and secured, preferably by screw-thread, steam-tight in the upper end of the shaft 16. A collar 33, adjustable by screw-thread on the stem 31, is fitted to slide vertically in the chambered upper extremity of the head 32, and a spring 34, interposed between the collar 33 and the bottom of the chamber in the head 32, is adapted to hold the valve 30 upwardly normally, but yieldingly, in such position that the ports in the valve register, respectively, with the ports 26 and 27 in the shaft 16. A lock-nut 35, turning by screw-thread on the stem 31 against the collar 33, locks it in position when adjusted. A plurality of gravity-actuated weights 36 on the outer arms of radial levers 37 37 are adapted when the shaft 16 rotates rapidly to be elevated by the centrifugal force of the rotation, and as the arms 37 are pivoted to an annular flange 38 on the head 32 the inner arms of the levers 37 go down correspondingly, and said inner arms, being fitted in an annular groove in the collar 33, correspondingly depress the collar, the stem 16, and the valve 30 against the resistance of the spring 34 and partially or entirely close the induction and eduction ports 26 and 27, thereby regulating the supply of steam and consequently the rotary motion of the shaft 16 and its load.

An annular chamber about the stem 16 in the lower portion of the plug 32', which is adapted for inserting packing therein, is closed at its lower end by a sleeve-nut 39, turning by screw-thread into the plug. An annular boss or rib 40 about the shaft 16 strengthens it and forms a support for the attachment of the arms 38.

The wheel-frame 17 consists, preferably, of a hub 41, made of an upper and lower portion secured together by screws, the abutting faces of the hub being provided with grooves adapted to receive therein the angle of two integral wire spokes 42, which spokes are held in place by the clamping together of the upper and lower members of the hub by means of screws, and the free ends of the spokes are clasped around a heavy integral wire rim or felly 43. A guard-wire 44 is secured to the spokes, conveniently by soldering it thereto, at a little distance from and on the inside of the felly 43. The receptacles or pockets 18 are provided with hangers 45, which at their upper extremities terminate in hooks adapted to take onto the felly 43, the nose of the hooks passing between the felly and the guard 44, thus securing the pockets in place on the wheel-frame against accidental displacement. A shaft-box 46, secured to the under side of the cover 12 and bushed or lined with Babbitt metal, serves as a bearing for the shaft 16. The hub 41 and the box 46 advisably abut against each other, thus preventing upward displacement of the shaft 16.

What I claim as my invention is—

1. The combination with a large chambered case and a shaft-bearing member affixed to the bottom of the case and provided with an independent steam-chamber, of a shaft disposed vertically in and centrally through the case and footed in the shaft-bearing member said shaft having a short axial steam-chamber provided with a port registering with the steam-chamber in the shaft-bearing member and with hollow radially-disposed arms in the chamber of the large case said arms leading from the axial steam-chamber in the shaft and being provided at their extremities with orifices discharging tangentially into said case-chamber.

2. The combination with a hollow revoluble shaft having an induction and an eduction port at a distance apart longitudinally of the shaft, of a hollow piston-valve extending past said induction and eduction ports and having ports conformable with said induction and eduction ports in the shaft, said valve being movable endwise in the shaft, a valve-stem extending along in the shaft, gravity-weights on swinging levers pivoted on the shaft, the inner ends of which levers act on a collar on the stem, and a spring adapted to lift the stem and valve but to be overcome by the action of the governor or gravity-weights under centrifugal motion.

3. The combination with a steam-holding carriage-case having an eduction-port, of a shaft-bearing member at the bottom of the case and provided with a steam-chamber having an induction-port, a hollow carriage-shaft closed at its ends journaled in the case and having a steam-port registering with said chamber, hollow radial arms in the case on the shaft and leading therefrom and discharging tangentially into the steam-holding case, a chambered sliding valve in the shaft having ports registering normally with its induction and eduction ports, a valve-stem, a spring lifting the stem and the valve, and weighted levers pivoted on the shaft and disposed to depress the stem and valve when raised by centrifugal action.

In testimony whereof I affix my signature in presence of two witnesses.

FRED SEAVER.

Witnesses:
A. W. GREENWOOD,
GEO. E. GREENWOOD.